United States Patent Office  3,478,020
Patented Nov. 11, 1969

3,478,020
BENZENEDIACETONITRILES
Ferdinand B. Zienty, Warson Woods, and Myron J. Holm, St. Louis, Mo., assignors to Monsanto Company, St. Louis, Mo., a corporation of Delaware
No Drawing. Filed Nov. 9, 1966, Ser. No. 592,984
Int. Cl. C09b 23/00, 23/10
U.S. Cl. 260—240                10 Claims

ABSTRACT OF THE DISCLOSURE

Condensation products of thiophene aldehydes with benzenediacetonitriles, dithenylidenebenzenediacetontriles are of particular value as thermally stable antioxidants for high temperature fluids and lubricants.

---

The compounds of this invention are generally identified as dithenylidenebenzenediacetonitriles and are characterized by the following structural formula:

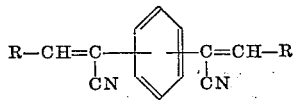

wherein R is selected from the group consisting of

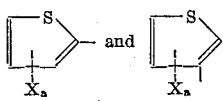

wherein $a$ is an integer from zero to two, and X is selected from the group consisting of chlorine, bromine and lower alkyl.

The dithenylidenebenzenediacetonitriles of the present invention can be prepared by the condensation of a thiophene carboxaldehyde with a benzenediacetonitrile. The benzenediacetonitrile used can be ortho, meta, or para, as well as mixtures of these isomers in any proportion. In most instances it is preferred to employ as starting materials aldehydes and benzenediacetonitriles having the substituents required in the reaction product. However, unsubstituted reactants can be employed and the substituents then introduced into the molecule. Alternately, the substituents can be modified after condensation. In the course of these reactions, two moles of a thiophene carboxaldehyde combine with one mole of the benzenediacetonitrile. Thus the reactants are preferably used in these approximate proportions. However, it will be readily appreciated that deviations from the 2:1 molar proportion in the reaction mixtures may at times be dictated by the relative ease of specific reactions and other related factors. As will be brought out more fully hereinafter, the reaction is catalytically induced and is executed in a suitable inert solvent system.

Substituted thiophene carboxaldehydes that can be used in accordance with this invention include:

5-chlorothiophene-2-carboxaldehyde
5-bromothiophene-3-carboxaldehyde
4-methylthiophene-2-carboxaldehyde
5-ethylthiophene-3-carboxaldehyde
3-butylthiophene-2-carboxaldehyde
2-chlorothiophene-3-carboxaldehyde
4,5-dimethylthiophene-2-carboxaldehyde
4-ethyl-5-methylthiophene-2-carboxaldehyde
5-chloro-4-methylthiophene-2-carboxaldehyde
4,5-dimethylthiophene-3-carboxaldehyde
5-bromo-4-methylthiophene-3-carboxaldehyde
2,5-dichlorothiophene-3-carboxaldehyde
2,5-dibromothiophene-3-carboxaldehyde
2-chloro-5-methylthiophene-3-carboxaldehyde
3,4-dimethylthiophene-2-carboxaldehyde While the above list enumerates each of the types of substituted aldehydes, in the interest of clarity and brevity no attempt has been made to specifically name each individual member of this group. The remaining substituted aldehydes that can be employed differ only isomerically, or in the number of carbon and other atoms in the substituents, or in the particular halogen used. Thus, in the above tabulation, the chlorine can, in each instance, be replaced with bromine, and the carbonaceous substituents replaced with their homologs containing as many as four carbon atoms.

The benzenediacetonitrile to be condensed with the thiophene carboxaldehyde can be ortho, meta or para.

The process of the present invention is carried out by dissolving the reactants in an inert solvent system, and maintaining the solution until the reaction is complete. The completion of the reaction is generally evidenced by precipitation of the reaction product from the solution. The compounds thus obtained are readily separated from the reaction mixture by conventional means such as decantation, distillation and the like. The preferred solvents are the lower aliphatic mono-hydroxy alcohols containing from one to three carbon atoms inclusive. However, other inert solvents such as benzene, tetrahydrofuran, chloroform, and the like can be used. The reaction system is rendered alkaline by the introduction of a base such as, for example, sodium ethoxide, sodium hydroxide, or potassium methoxide. For optimum results the reaction is activated with a suitable catalyst such as piperidine, piperidinium acetate, pyridine, triethylamine, triethylenediamine and the like. With most reactants the reaction can be carried out at approximately room temperature. However, elevated temperatures up to the boiling point of the system can be used to expedite the procedure.

The compounds of the present invention are relatively high melting materials, many of them exhibiting liquid crystallinity. This phenomenon, also known as mesomorphism, is best demonstrated when the compounds are heated above their melting points. As the temperature is gradually elevated, the compounds are transformed from the crystalline state to a turbid melt which at still higher temperatures is abruptly clarified. The turbid condition is considered to be an intermediate state between the solid and liquid states in which the molecules have attained freedom of movement in certain directions but are still constrained in others. This turbidity appears to be due to the presence of a large number of small zones, with the molecules in a given zone being all similarly constrained, and thus showing different optical properties in different directions. The turbid state is stable through an approximate range of 10 to 90 or more degrees centigrade. This inherent characteristic of the compounds under consideration materially enhances their utility and versatility since normally liquid state reactions, such as polymerizations, can be carried out in this state in which the molecules are held in an orientation much more restricted than is obtainable in the liquid state.

The invention will be further clarified by reference to detailed description of the preparation of compounds encompassed thereby. Unless otherwise specified, all proportions throughout this specification are expressed in parts by weight.

EXAMPLE 1

Di-(2-thenylidene)

11.2 grams of thiophene-2-carboxaldehyde and 7.8 grams of p-benzenediacetonitrile are dissolved in 65 ml. of warm 95% ethanol. A sodium ethoxide solution is prepared by dissolving 1.2 grams of sodium in 25 ml. of ethanol, and 0.5 ml. of this solution is added to the reaction mixture. A precipitate forms rapidly and solidifies the mixture, and more alcohol is added to allow stirring. After 30 minutes, the solid is collected, washed thoroughly with ethanol and then with water. After drying, the product weighs 16.5 grams and melts about 265° C. A 1 gram sample is recrystallized from 1 liter of acetonitrile yielding 0.8 gram of yellow needles, M.P. 273–4° C. The analytical sample is again recrystallized, M.P. 274–274.5° C. This product is soluble in chloroform and dimethylformamide.

Elemental analysis of the product shows 69.63% carbon, 3.43% hydrogen, 7.98% nitrogen and 18.48% sulfur as against calculated values of 69.74%, 3.51%, 8.13% and 18.62% respectively for $C_{20}H_{12}N_2S_2$ (M.W. 344.44).

The procedure of Example 1 is followed in the condensation of other heterocyclic aldehydes with ortho, meta and para benzenediacetonitrile. In executing this process the following dithenylidenebenzenediacetonitrile (I) are prepared by condensing two moles or a slight excess (up to 25%) of the appropriate aldehyde (II) with one mole of a benzenediacetonitrile (III).

Example 2:
    (I) α,α′-Di-(3-thenylidene)-p-benzenediacetonitrile
    (II) Thiophene-3-carboxaldehyde
    (III) p-Benzenediacetonitrile Example 3:
    (I) α,α′-Di-(5-chloro-3-thenylidene)-p-benzenediacetonitrile
    (II) 5-chlorothiophene-3-carboxaldehyde
    (III) p-Benzenediacetonitrile Example 4:
    (I) α,α′-Di-(4-methyl-2-thenylidene)-m-benzenediacetonitrile
    (II) 4-methylthiophene-2-carboxaldehyde
    (III) m-Benzenediacetonitrile Example 5:
    (I) α,α′-Di-(5-butyl-3-thenylidene)-m-benzenediacetonitrile
    (II) 5-butylthiophene-3-carboxaldehyde
    (III) m-Benzenediacetonitrile Example 6:
    (I) α,α′-Di-(5-bromo-2-thenylidene)-o-benzenediacetonitrile
    (II) 5-bromothiophene-2-carboxaldehyde
    (III) o-Benzenediacetonitrile Example 7:
    (I) α,α′-Di-(4,5-dichloro-2-thenylidene)-p-benzenediacetonitrile
    (II) 4,5-dichlorothiophene-2-carboxaldehyde
    (III) p-Benzenediacetonitrile The compounds prepared in accordance with the present invention are high melting crystalline materials which are insoluble in water but readily soluble in a wide variety of commercially available solvents. They are of particular value as thermally stable antioxidants for high temperature fluids and lubricants.

Numerous modifications and additional compounds will readily suggest themselves to those skilled in the art.

What is claimed is:
1. A compound of the formula

wherein R is selected from the group consisting of

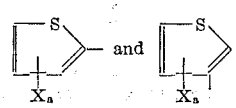

wherein $a$ is an integer from zero to two, and X is selected from the group consisting of chlorine, bromine and lower alkyl.

2. A compound as defined in claim 1 wherein R is

and $a$ is zero.

3. A compound as defined in claim 1 wherein R is

$a$ is one and X is chlorine.

4. A compound as defined in claim 1 wherein R is

and $a$ is zero.

5. A compound as defined in claim 2 wherein the substituents on the phenylene nucleus are in para positions.
6. A compound as defined in claim 2 wherein the substituents on the phenylene nucleus are in meta positions.
7. A compound as defined in claim 3 wherein the substituents on the phenylene nucleus are in para positions.
8. A compound as defined in claim 4 wherein the substituents on the phenylene nucleus are in para positions.
9. A compound as defined in claim 3 wherein the substituents on the phenylene nucleus are in meta positions.
10. A compound as defined in claim 1 wherein R is

$a$ is one and X is chlorine.

References Cited
UNITED STATES PATENTS
3,282,931   11/1966   Zienty et al. _____ 260—240

JOHN D. RANDOLPH, Primary Examiner

U.S. Cl. X.R.

252—45, 406; 260—332.3